United States Patent [19]

McKinley et al.

[11] Patent Number: 5,019,838

[45] Date of Patent: May 28, 1991

[54] ROTATIONAL PLANAR CHART RECORDER AND CHART THEREFOR

[75] Inventors: William E. McKinley, Stamford; James P. Crimmins, Westport; Robert G. Russell, Danbury, all of Conn.

[73] Assignee: Omega Engineering, Inc., Stamford, Conn.

[21] Appl. No.: 283,528

[22] PCT Filed: May 18, 1988

[86] PCT No.: PCT/US88/01691

§ 371 Date: Oct. 27, 1988

§ 102(e) Date: Oct. 27, 1988

[87] PCT Pub. No.: WO88/09482

PCT Pub. Date: Dec. 1, 1988

Related U.S. Application Data

[63] Continuation-in-part of Ser. No. 53,083, May 22, 1987, abandoned.

[51] Int. Cl.⁵ .............................. G01D 15/16
[52] U.S. Cl. ................................. 346/121
[58] Field of Search ............... 346/121, 33 C, 33 ME, 346/33 D, 33 TP, 112, 121, 137, 102; 40/904; D10/46

[56] References Cited

U.S. PATENT DOCUMENTS 910,630  1/1909  Young .
999,412  8/1911  Speer .
1,720,148  7/1929  Rodanet .
3,084,014  4/1963  Molloy .
3,914,773  10/1975  Harrower .
4,186,404  1/1980  Guyot .
4,212,016  7/1980  Ruhl .
4,337,471  6/1982  Hubbard .

OTHER PUBLICATIONS

Leeds & Northrup, "Micromax Model R Recorder", 8/1934.
"Temperature Humidity Recorder" sales literature in Temperature Measurement Handbook and Encyclopedia.
"Strip Chart Recorders" sales literature in Temperature Measurement Handbook and Encyclopedia.

Primary Examiner—Benjamin R. Fuller
Assistant Examiner—Huan Tran
Attorney, Agent, or Firm—Bruce E. Hosmer

[57] ABSTRACT

A chart recorder is described for recording parameters such as temperature and humidity on rotating planar charts. Pens, which are used to form traces on a chart as this is rotated, are moved by pen actuators along travel paths that are parallel to a straight radius relative to the axis of chart rotation. The pen actuators are electrically moved under the control of a microprocessor to positions as determined by representative of parameter values. Various mechanical and electrical control features are described whereby pen motions are caused intermittently so as to preserve battery power and achieve long term portable operation.

24 Claims, 9 Drawing Sheets

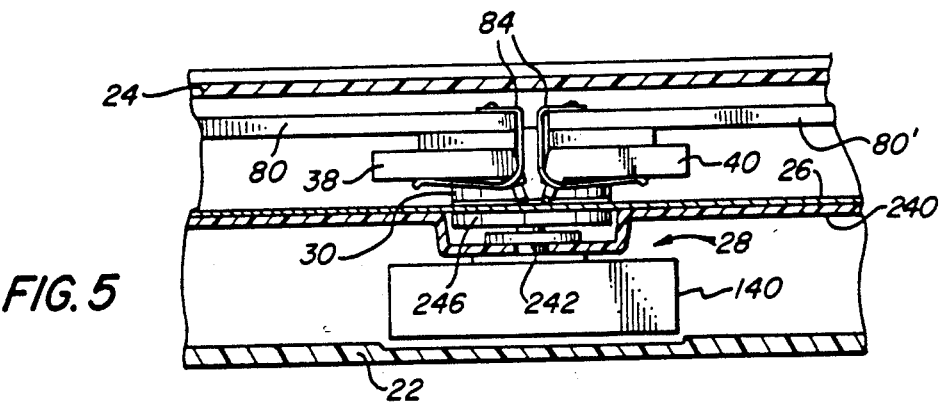
FIG. 5
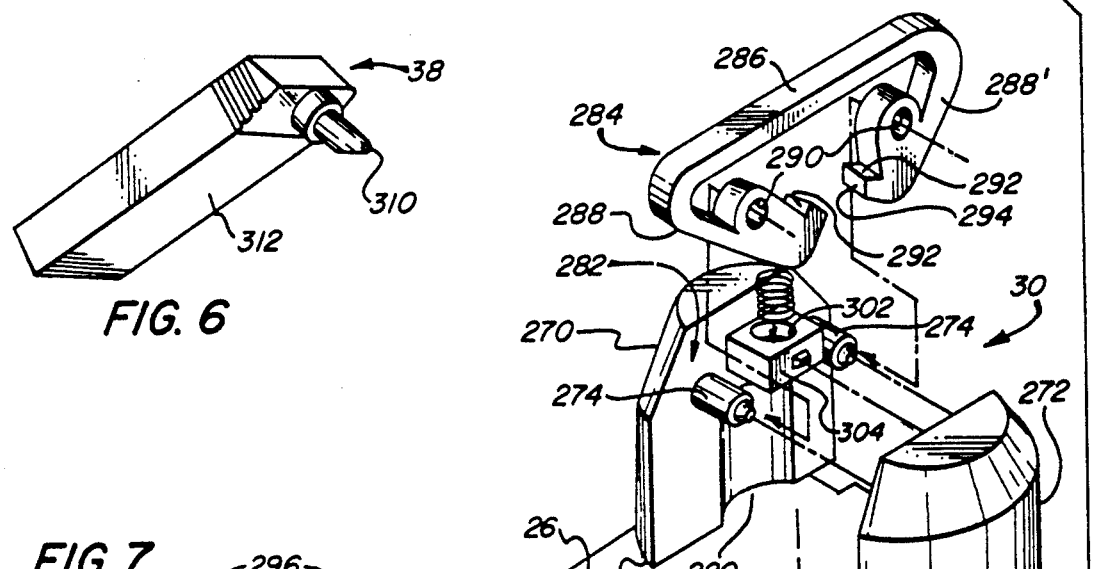
FIG. 6
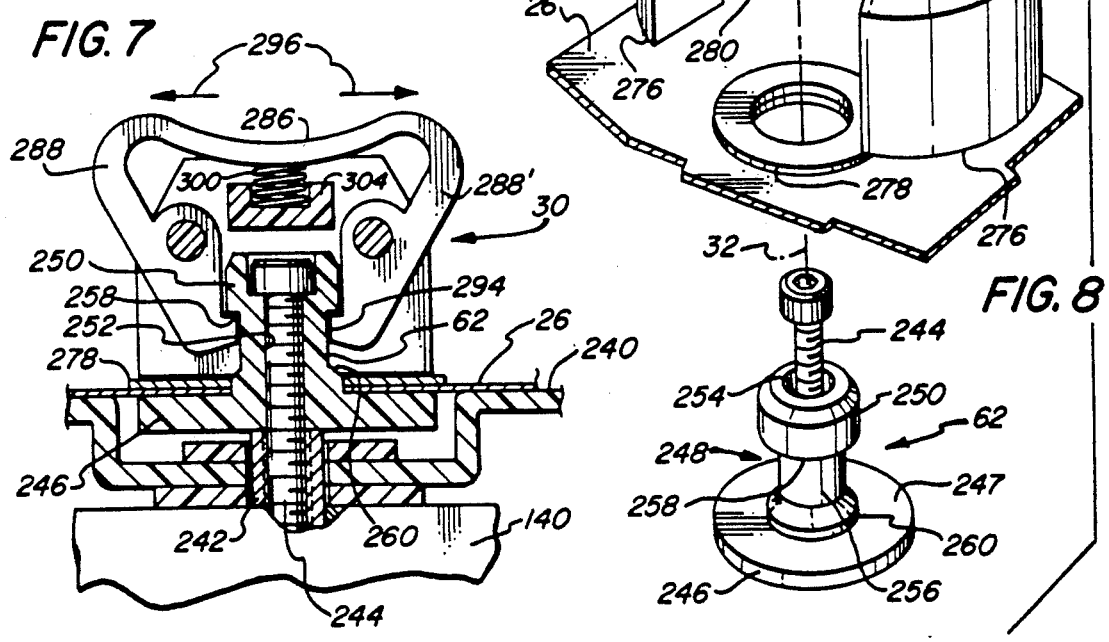
FIG. 7
FIG. 8

ROTATIONAL PLANAR CHART RECORDER AND CHART THEREFOR

This application is a continuation in part of U.S. patent application Ser. No. 07/053,083 Filed May 22, 1987 by JAMES P. CRIMMINS and ROBERT G. RUSSELL entitled ROTATIONAL PLANAR CHART RECORDER AND CHART THEREFOR, now abandoned.

FIELD OF THE INVENTION

This invention relates generally to planar chart recorders of the rotary type and charts for these. More specifically, this invention relates to portable chart recorders.

BACKGROUND OF THE INVENTION

Recorders of parameters such as temperature or humidity or both are well known. Typically, a recorder is provided with one or more pens that are directly coupled by suitable links to sensors. A replaceable planar circular chart is used which is mounted for rotation about an axis on a surface of the recorder under one or several pens. The recorder can be entirely mechanically driven, such as with a spring-wound motor to rotate the chart and with the stylus or pen mounted on, for example, a coiled, bimetallic temperature sensor that causes the pen to move along part of a circular path to record a temperature trace on the chart.

Because the pen motion is along a curved path, the chart bears time lines that are correspondingly curved. In this manner, parameter values can be read from a recorded trace, though with some level of difficulty due to the non-linear appearance of the reference time lines. When several different parameters are to be recorded on the same chart, the different traces, though usually of different colors to enhance their visual separation, are off-set in time with respect to each other. This is due to the different pivot arm lengths associated with the pens. As a result, the combination of curved time lines and time off-set between different traces makes these multiple trace charts more cumbersome to analyze.

In practical applications, it is important that recorders can operate reliably in the absence of electrical power. It is important, for example, for insurance purposes to know what the temperature and humidity conditions are in a computer room after a power failure has occurred. Also, when food is transported in a frozen state, it is desirable to have a record of temperature conditions within the transport.

Portability of a flat chart recorder, therefore, is an important characteristic. Fully mechanical recorders are portable but normally do not have sufficiently long operating cycles for many applications. Battery operated flat chart recorders often have practical time limits that are below desirable operating periods. Mechanically moved pens also tend to be inaccurate as well as difficult to provide compensation for.

FIELD OF THE INVENTION

With a rotational planar chart recorder in accordance with the invention a long-term portable operation is achieved while accommodating one or several parameter measurements. Multiple parameters can be recorded in a visually clear manner that is convenient to analyze. Long duration portable battery operations can be achieved of the order of twenty-eight day cycles while using electronically positioned pens.

This is achieved with one form for a chart recorder in accordance with the invention by employing a trace recording pen that moves parallel to a radius along a line that is substantially a straight radial path relative to the axis of rotation of the chart. The chart is provided with concentric circles representing parameter values and with straight radial time lines. As a result, multiple pen traces are particularly conveniently read and interpolated.

As described herein for one preferred form of the invention, a pair of pens are used. The pens can form ink traces or be heat elements or any other type of marker. Each pen is supported by an arm which is moved by an electrically powered actuator that is aligned to operate in parallel to the desired radial travel paths of the pens. The pen actuators are located on opposite sides of the travel paths and each operatively engages an arm. The arms extend towards each other so that their respectively-supported pens are placed in time proximity to one another relative to the rotation of the chart. In this manner, each pen can form a trace that uses the full scale of the chart without interference with the other pen. Yet different traces substantially relate to the same time as viewed along a straight radius.

Although the pens can operate in very close proximity, some time displacement is necessary if each pen is to move without interference with the other. In accordance with the invention, even this time displacement can be removed by delaying positioning of the leading pen by an amount equal to their respective time displacement. Alternately, pens may be placed on the same time line, with the soft pen tips deforming around each other during those rare occasions when the pens must cross.

A particularly advantageous feature of a chart recorder in accordance with the invention is that the pens can be efficiently moved with very low electrical power consumption. This enables long term operation on battery power so as to record parameter values over a twenty-eight day cycle. One such technique involves the regular sampling of a parameter signal and then causing pen motion from the position required by the last sample. The sampling rate is made sufficiently high so as to follow variations of the parameter and yet sufficiently low to save battery power for a long operating cycle.

It is, therefore, an object of the invention to provide a rotatable planar chart recorder which provides conveniently read traces of a parameter such as temperature, relative humidity and the like. It is a further object of the invention to provide a planar chart with a simplified scale pattern. It is still further an object of the invention to provide a planar chart recorder capable of long-term battery operation, provide accurate temperature and humidity indications and an ability to compensate for non-linear characteristics.

These and other objects and advantages of the invention can be understood from the following detailed description of a preferred embodiment for a rotational planar chart recorder as shown in the drawings.

BRIEF DESCRIPTION OF THE DRAWINGS

FIG. 5 is a partial section view of the chart recorder taken along the line 5—5 in FIG. 4;

FIG. 6 is a perspective view of the chart holder used to mount a planar chart to the chart recorder of FIG. 1;

FIG. 7 is a section view of the chart holder;

FIG. 8 is a perspective exploded view of the chart holder of FIG. 7;

DETAILED DESCRIPTION OF DRAWINGS

Figure 1:
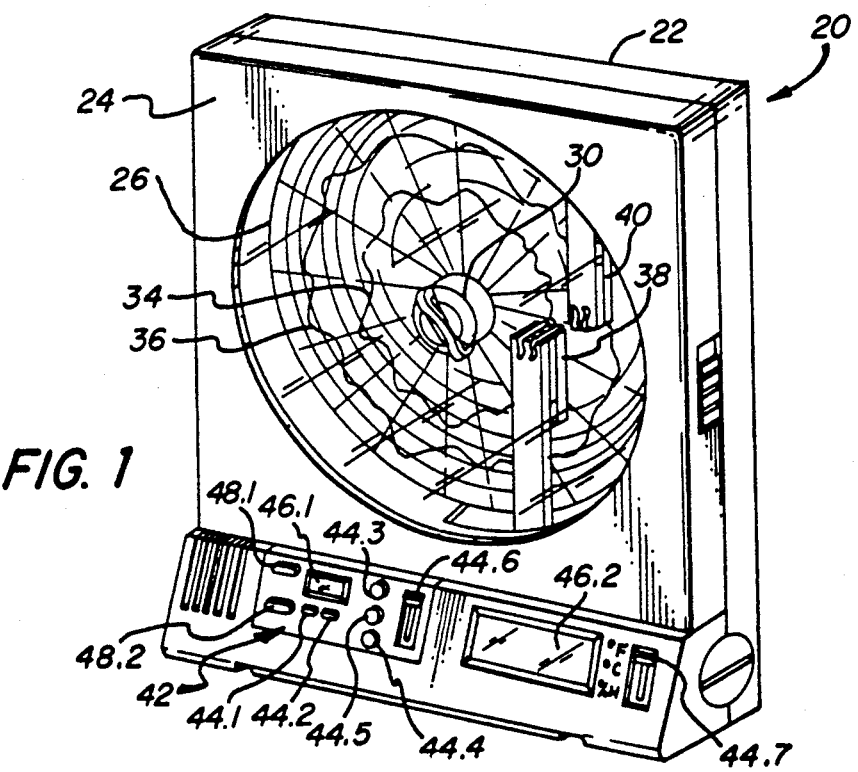
FIG. 1 is a perspective view of a rotational planar chart recorder in accordance with the invention.
Figure 2:
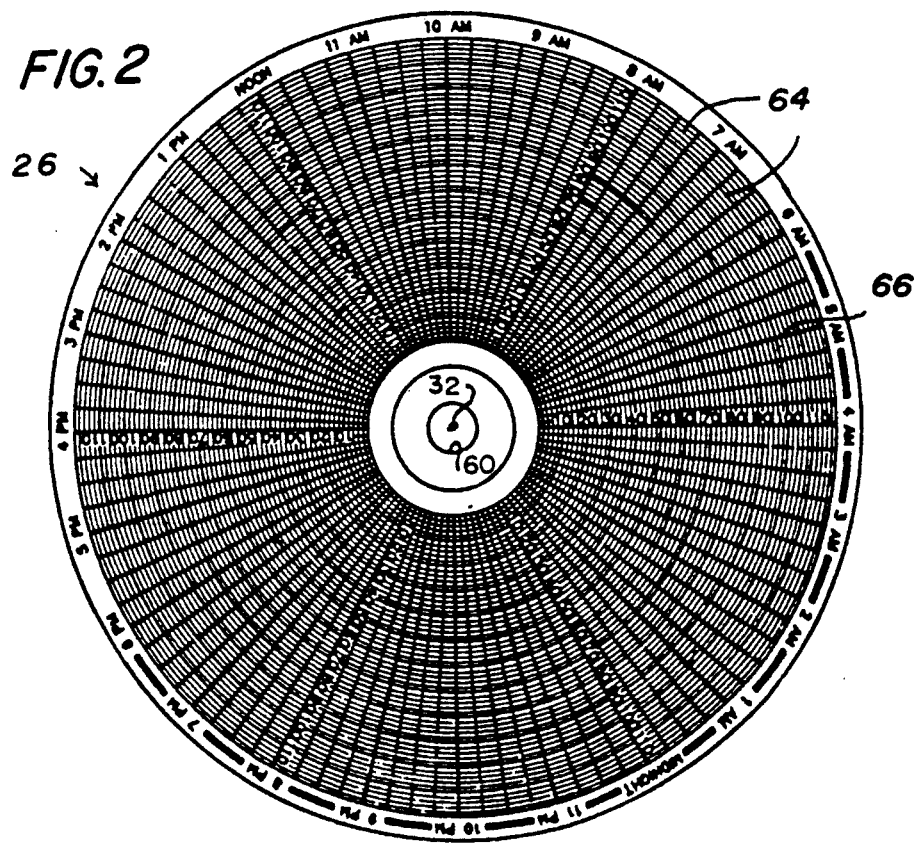
FIG. 2 is a plan view of a planar chart in accordance with the invention.

With reference to FIG. 1, a rotary planar chart recorder 20 is shown formed with a housing 22 having a windowed door 24 through which a planar chart 26 can be seen. Chart 26 is rotated by a drive 28, not shown in FIG. 1 but see FIG. 5, with a removable chart holder 30 being used to link the drive 28 to chart 26 and cause it to rotate about an axis 32, see FIG. 2. Drive 28 can be a mechanical drive but preferably is electrically controlled as described herein.

Planar chart 26 is shown provided with two separate traces 34, 36 formed by a pair of pens 38, 40. Pens can form a trace with many different marking techniques. The pens are moved under control by a microprocessor along lines that are parallel straight radial lines. A panel 42 provides a place for a plurality of switch controls 44, LCD displays 46 and power switches 48.1 (on) and 48.2 (off).

The panel includes a time of day clock display 46.1 and is provided with associated time setting and time advancing controls 44.1 and 44.2. Peak signal display selectors 44.3 (high), 44.4 (low) are provided as well as a peak reset switch 44.5 which erases the currently stored peak values to enable new peak values to be stored.

A chart rotational speed control 44.6 is provided with three settings of one-day, seven-day and twenty-eight-day intervals for one rotation of chart 26. A three-position display control 44.7 enables the selection of the current temperature in Fahrenheit, °F; Celsius, °C; or the percentage of relative humidity, H.

The planar chart 26 includes a central opening 60 to mount the chart on a rotating drive element such as a drive spindle 62 (see FIG. 7). Chart 26 further carries a plurality of concentric circle 64 as is common in rotary planar charts. Each circle represents a particular parameter value as indicated by the numerals adjoining the heavier circles. Chart 26 is further provided with straight radial time lines 66 each of which presents a particular time within the rotary interval represented by chart 26. In the example, of FIG. 2, chart 26 is intended to record parameter values for one full day, though longer intervals of seven and twenty-eight days are contemplated for charts 26.

Use of chart 26 is similar to conventional chart recorders. Door 24 is opened and the chart holder 30 is released and removed to enable placement of chart 26 onto the spindle 62. The chart is rotated to align the starting time line, such as the one that corresponds to the actual time of day with the travel paths for pens 38, 40. The chart holder 30 is then remounted to establish a connection between the spindle 62 with the chart 26. With the pens 38, 40 mounted to the door 24, an automatic pen lift is achieved to facilitate installation or removal of a chart.

Figure 3:
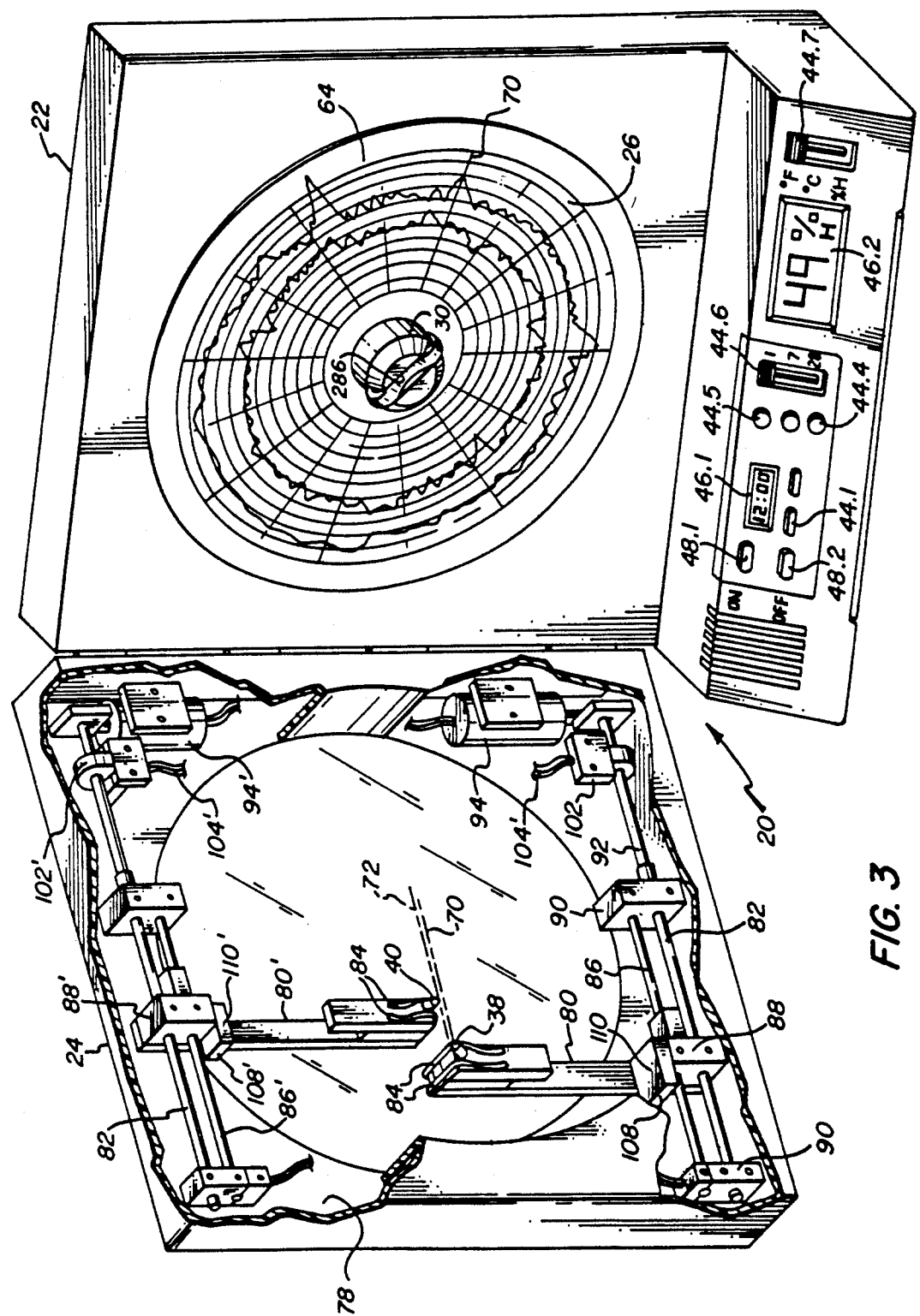
FIG. 3 is an enlarged perspective view of the chart recorder of FIG. 1, but with the door open.
Figure 4:
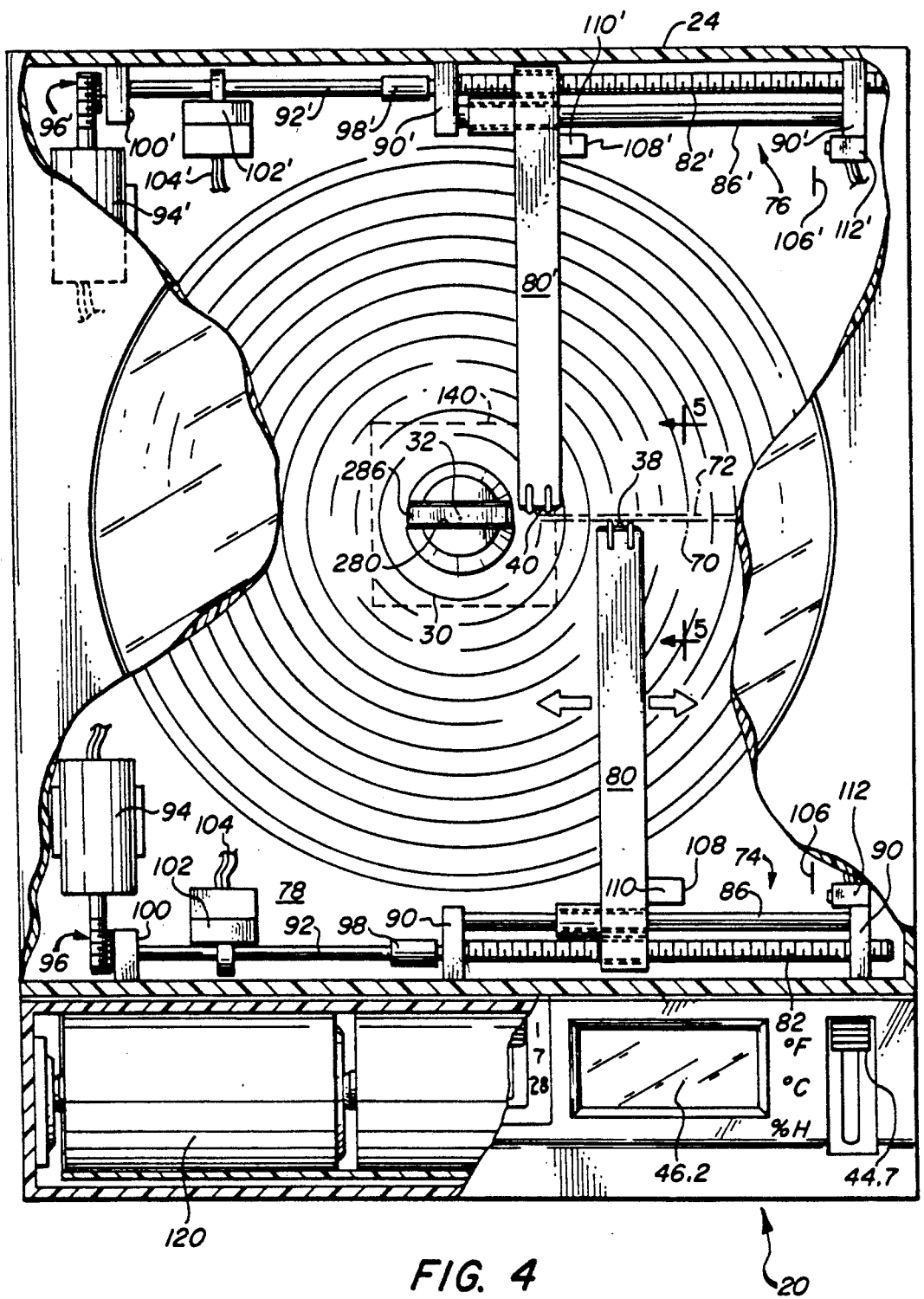
FIG. 4 is a front view in elevation and partly broken away of the chart recorder of FIG. 1.

With reference to FIGS. 3 and 4 the chart recorder 20 is shown with greater detail. The pens 38, 40 are mounted to travel along straight paths 70, 72 that substantially extend radially from the rotational axis 32 and are parallel to a straight radius from axis 32. Travel paths 70, 72 are in close physical, and thus also time, proximity to each other. Their separation represents a small portion of the total rotational interval of a chart 26, typically about a minute for a 24-hour chart 26 or less than one tenth of one percent of a whole revolution.

This is achieved by using a pair of pen actuators 74, 76 that are aligned to operate parallel to paths 70, 72 and are located on opposite sides of the paths and chart 26 within a recess 78 of door 24. Actuators 74, 76 are of like construction and include arms 80, 80' which operatively engage lead screw 82, 82'. Arms 80, 80' extends towards each other and thus paths 70, 72 and removably support pens 38, 40. Clips 84 are used to hold the pens 38, 40 in position. The pens 38, 40 can be positioned to produce markings along an essentially common radial path where paths 70, 72 merge. In such case, the soft pens can deform around each other during those rare occasions when the pens must cross. lead screws 82, 82'. Lead screws 82, 82' are journaled in blocks 90, 90' which are affixed to door 24. Shafts 92, 92' connect drive motors 94, 94' through worm gear arrangements 96, 96' to lead screw 82, 82' by way of couplings 98, 98'. Shafts 92, 92' are journaled in blocks 100, 100' that are also affixed to door 24.

Positioning of pens 38, 40 is controlled with position sensors 102, 102' which sense the rotations of shafts 92, 92' and thus also those of lead screw 82, 82'. The position sensors provide output signals on lines 104, 104' in the form of pulses, each of which can represent a full lead screw rotation but preferably a known fraction thereof. Since the pitches of the lead screw 82, 82' are known, each pulse represents a certain amount of straight radial travel along a path 70 or 72.

Actual positioning of the pens 38, 40 is done by measuring the number of pulses on lines 104, 104' relative to reference positions 106, 106' of arms 80, 80'. These reference positions are sensed when the leading edges 108, 108' of elements 110, 110' on arms 80, 80' interrupt light beams in light sensors 112, 112' that are operatively aligned with reference positions 106, 106'. The pen positions are thus determined by accumulating the number of pulses from an associated reference position.

A particularly advantageous feature of chart recorder 20 is that pen positioning can be done under electrical battery power. For this appropriate space is made available to store a practical number of D-sized batteries 120. These provide sufficient electrical power to maintain the chart recorder operational for at least as long a cycle as twenty-eight days and usually about two months. The number of batteries carried for this purpose is limited to what is practical to avoid excessive weight and size of the recorder.

Figure 9:
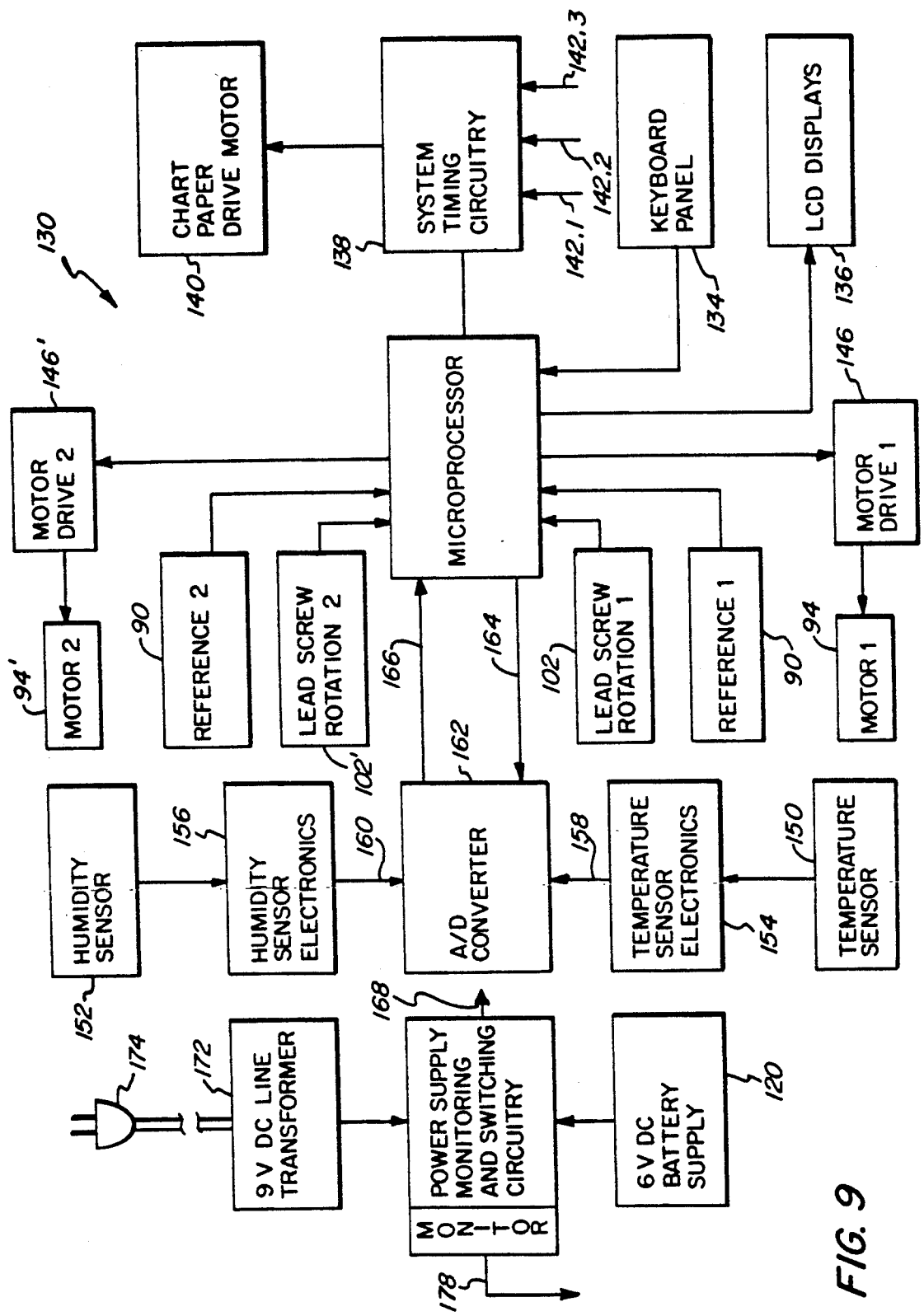
FIG. 9 is a block diagram of the electrical network used to operate the chart recorder of FIG. 1.

With reference to FIG. 9, an electrical system 130 is shown to operate chart recorder 20. A microprocessor 132 is used with a keyboard 134 that includes the control switches previously described with reference to the panel 42 shown in FIG. 1. An output to a display 136 is provided which in this case includes the liquid crystal displays 46.1 and 46.2. Communication between microprocessor 132 and the keyboard 134 and with the displays 136 involves known circuits and protocols and typically includes additional connectors for coupling to other removable external devices for special loading and checking functions during assembly of chart recorder 20.

A system timing circuit 138 is provided to deliver appropriate timing pulses to a chart paper drive motor 140. These pulses are generated at a sufficient rate to move the motor at a speed so as to rotate chart 26 once a day, in seven days, or in 28 days. Hence, the chart speed control switch 44.6 (see FIG. 3) is coupled along several lines 142, see FIG. 5, to circuit 138 to control the pulse rate to motor 140. Chart paper motor 140 may be a stepper-type motor which will advance to successive positions in response to pulses from circuit 138 without consuming significant electrical current during the pauses between the pulses. Motor 140 can also be a mechanical device such as a geneva mechanism or a spring driven motor, all of which produce a rotating output shaft or element.

Processor 132 responds to interrupt timing pulses on line 144 from timing circuit 138 to cause a movement of bidirectional pen motors 94, 94' via motor drives 146, 146'. These pen actuating pulses occur at regular intervals with the rate being a function of the rotational speed of the chart paper drive motor 140. Thus, typically, pen motions are initiated once every minute for a 24-hour chart 26, once every seven minutes for a seven-day chart and every 28 minutes for a 28-day chart. Different pen actuating rates can be used with higher rates needed when significant changes in parameter values such as temperature or humidity occur in shorter intervals and it is desired to record these with the pens 38 or 40. The rates, when expressed in terms of angle of rotation, generally would occur in the range from about once every one-tenth to about once every half a degree of rotation.

The advantage of periodic activation of the pens 38, 40 is that substantial power savings are obtained resulting in much longer battery life. On the average about four times longer battery life is obtained in comparison with continuously moved pens.

In the chart recorder 20 two parameters are sensed, temperature with a sensor 150 and relative humidity with a sensor 152. These sensors can be an integral part of recorder 20 or be placed at external strategically desired locations.

The sensors 150, 152 produce output signals that are applied to suitable electronic circuits 154, 156 which generate appropriate output signals on lines 158, 160 at voltage levels suitable for conversion to digital format by A/D converter 162. A suitable multiplexer, not shown, is used to share A/D converter 162 between the different parameter signals.

Operation of A/D converter 162 is regulated by timing signals produced on lines 164 from processor 132 and in response parameter digital data is presented on parallel lines 166. The rate at which temperature and humidity are sampled by processor 132 can be very high, well in excess of what is normally required to sense their variations.

DC electrical power is delivered on lines 168 by a power supply monitoring and switching circuit 170. This circuit enables an automatic changeover from AC power available from AC transformer 172 and AC lines 174 to DC power from the battery supply 120.

Figure 10:
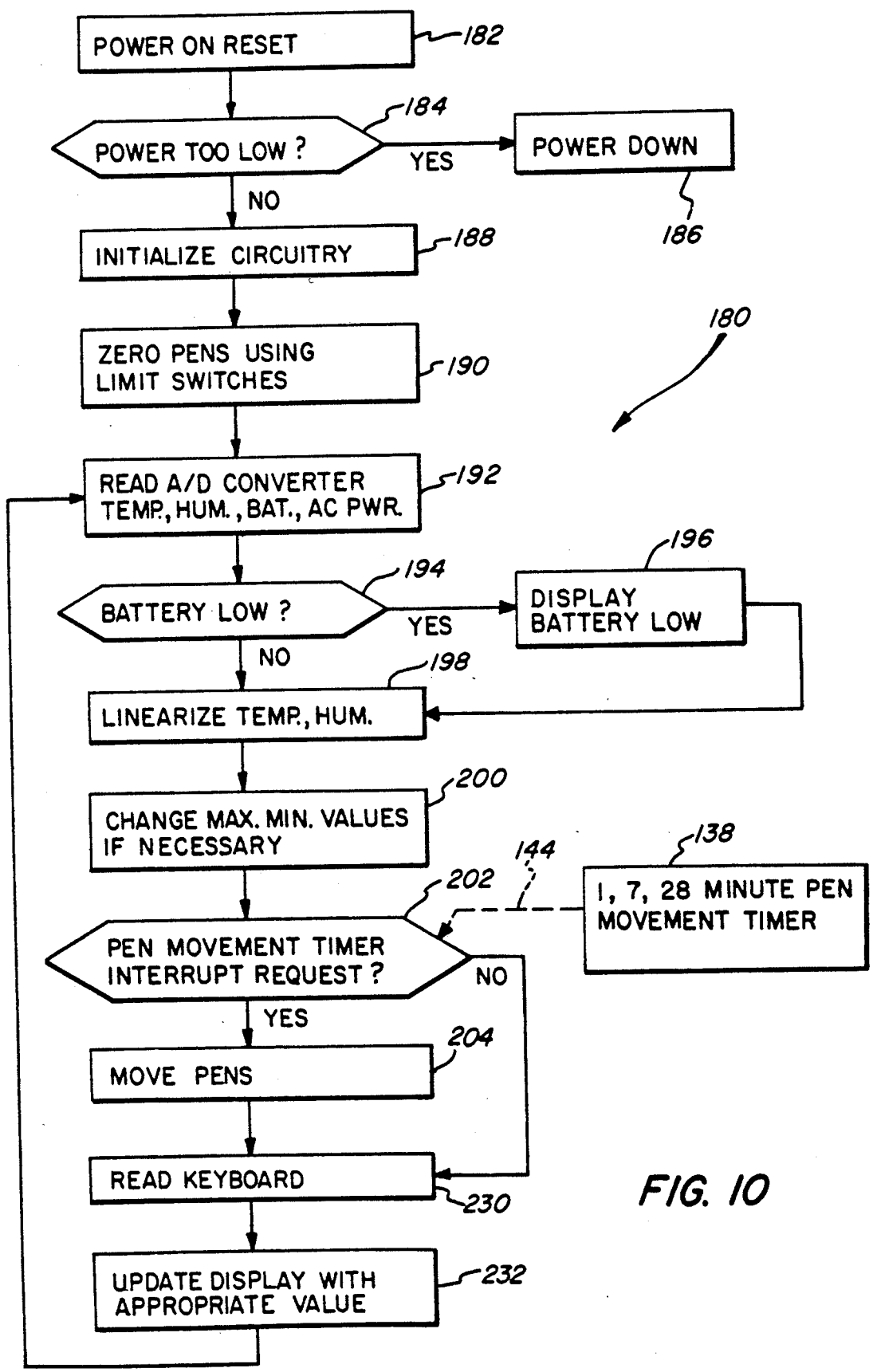
FIG. 10 is a flow chart for the operation of the microprocessor used in the network of FIG. 9.

FIG. 10 illustrates a flow chart 180 for the operation of recorder 20. When the recorder is turned on by activating the panel on switch 48.1 (see FIG. 2), the processor 132 responds with a reset mode at 182 in FIG. 10. The reset mode commences by first checking the voltage of the available power source. This is done by a monitor 176 inside circuit 170 (see FIG. 9) and which generates an output signal on line 178 which is coupled to processor 132. If the voltage is too low as tested at 184, the entire system is shut down at 186. When the voltage level checks out OK, the various circuits and program flags used in the system are initialized at 188.

The initializing operation includes at 190 the generation of appropriate drive signals to drive motors 146, 146' (see FIG. 9) so as to move the pens 38, 40 to their reference positions at 106, 106' (see FIG. 4). Once the pens reach these, the reference sensors 90, 90' (see FIGS. 4 and 9) generate appropriate interrupts to processor 132 to stop it from moving the pens 38, 40 any further.

At 192 the various signals that are external to processor 132 are read in. These include parameter values, temperature, humidity, battery voltage and AC power.

At 194 a test is made whether the battery power is low. If so, a low battery power indication is entered in display 46.2 at 196.

The values for temperature and humidity are linearized by processor 132 at 198 and the maximum and minimum values are stored or updated at 200. Thus, each parameter value is compared with the stored maximum and minimum and if the current values respectively exceed or are less than these, the current value is used to replace the stored value.

Linearizing of parameter measurements follows well known criteria and depend upon the characteristics of the sensors that are used. For example, microprocessor 132 may store a formula or a look-up table with which incoming sensor signals are corrected to enable recording on the linear scale of chart 26.

Figure 10A:
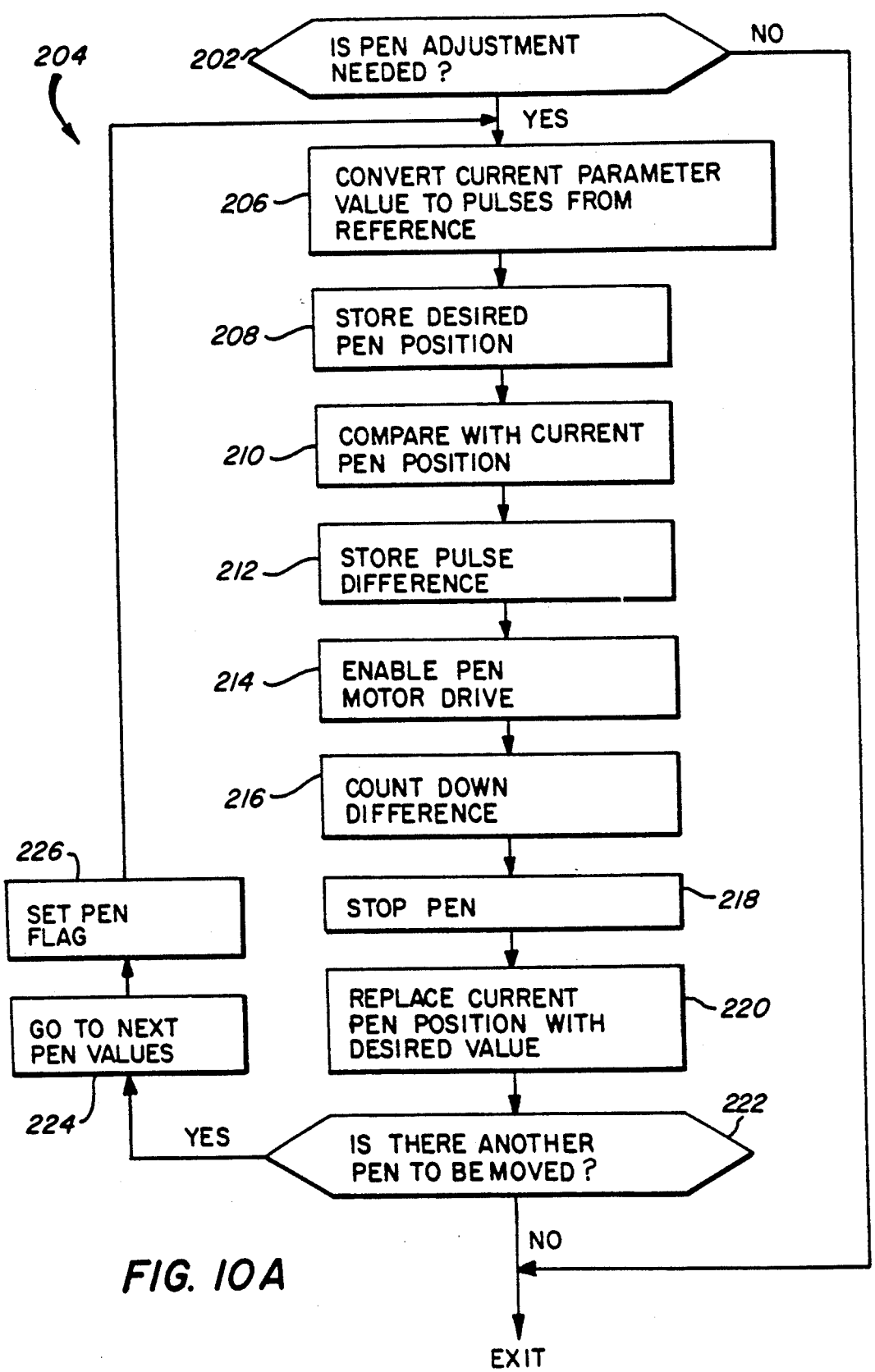
FIG. 10A is a flow chart showing the control over pen movements with greater detail.

At 202 a test is made whether an interrupt request was received on line 144 from timing circuit 138, see also FIG. 9. If so (as shown in FIG. 10A), the current values of the sensor signals are at 206 first translated into a number of pulses relative to the reference position 106, 106'. This conversion may be obtained by determining a scale factor by which, for example, the number of degrees in centigrade is directly converted to a specific number of pulses from sensors 102, 102'. Since the chart scales increase from left to right and the reference positions are at the high right end of the scale, the conversion also involves a subtraction of the specific number of pulses from the total number of pulses needed for a pen to travel the full length of a radial 66 on chart 26. The final pulse number is then stored at 208, FIG. 10A as a desired pen position. This value is then compared at 210 with the current pen position. If this is at a reference position 106 or at some other place, the difference in pulses is stored at 212.

Each pen motor is energized at 214 until the number of pulses detected from the appropriate lead screw rotation sensor 102 or 102' equals the difference as counted down as zero at 216. When this equal comparison is detected the drive 146 or 146' to the appropriate parameter motor is deactivated at 218 by processor 132.

The current pen position value is then replaced at 220 with the desired value as determined at 208 and a test is made at 222 if there is another pen to be moved. If so, at 224 other pen values are used and the appropriate pen flag incremented at 226 for use with test 222. A return is then made to step 206 to cause movement of this last pen.

By requiring an interrupt from timer circuit 138 to initiate a pen movement, a substantial saving in battery power is obtained since pen motors 94, 94' are but periodically operated. Since changes in temperature and humidity usually tend to occur slowly, the amount of pen movement required also tends to be small. The pen motors may thus be considered to be driven by pulses of durations commensurate with the desired pen position change.

After the pens have been moved, the keyboard or panel 42 is interrogated at 230 in FIG. 10 for the actuation of any of its keys. The appropriate displays are updated at 232 and a return is then made to step 192 to repeat the previously described process.

Figure 11:
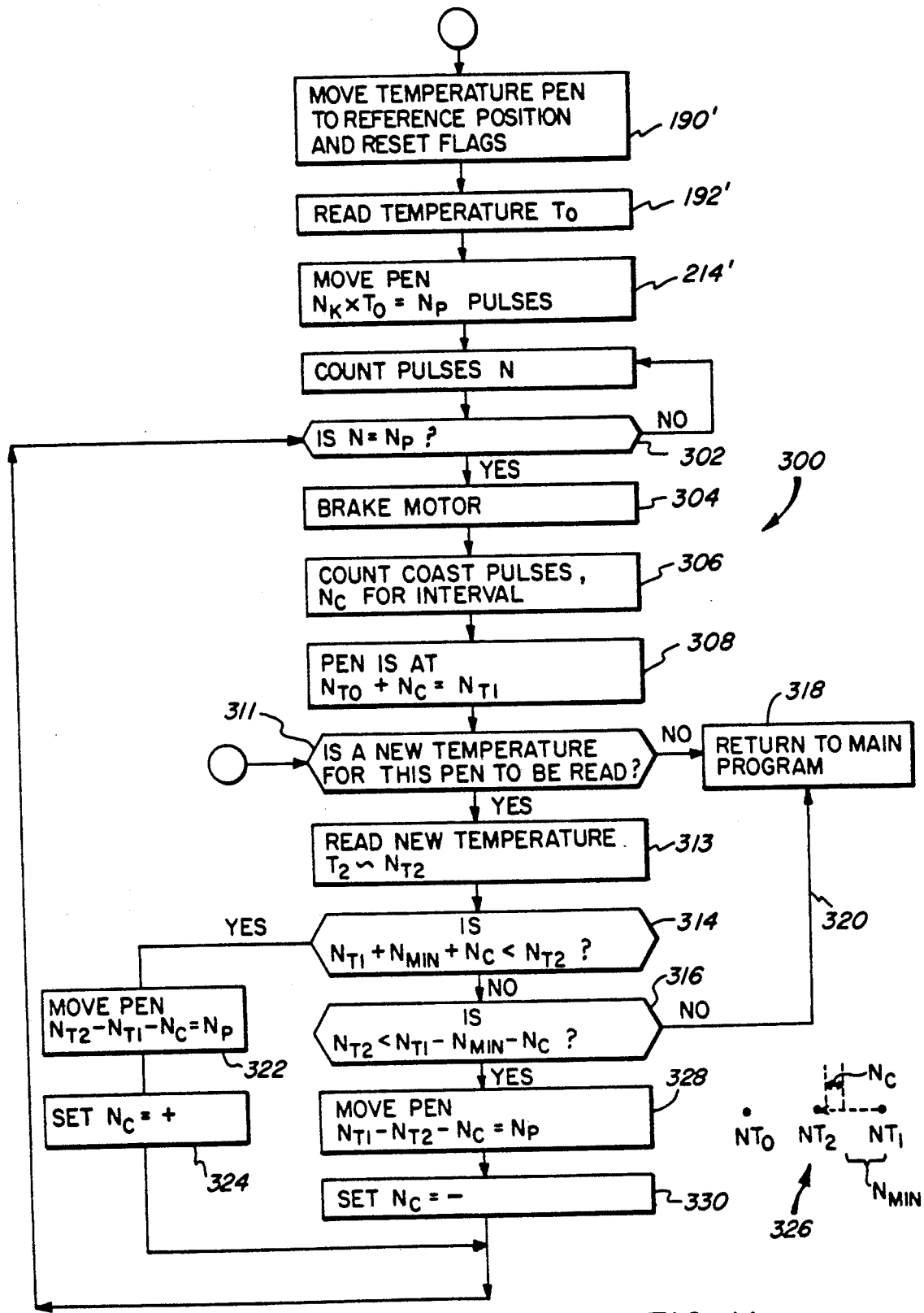
FIG. 11 is a flow chart showing a technique for correcting pen position information.

A particular advantage of the planar chart recorder in accordance with the invention is the ability to utilize low cost DC motors 94-94'. Such motors, however, typically tend to overshoot after power is turned off or even when a reverse braking potential is briefly applied. As shown in FIG. 11, a technique 300 is employed whereby pen motion past a desired position is measured and used to maintain pen position control.

The routine 300 is carried out both with program steps inside a microprocessor and the sensing of parameters as previously described with reference to FIGS. 10 and 10a. The FIG. 11 is shown for a single temperature recording pen such as 38 with a similar routine being applicable to a humidity recording pen such as 40. The steps describe the generation of various signals as explained below.

Thus at 190' in FIG. 11, like stop 190 in FIG. 10, a temperature recording pen 38 is first moved to its reference position as is needed at turn-on. If a temperature reading was made at 192', the temperature measurement is converted to a number of pulses, $N_p$, and a pen motion initiated at 214'.

When the pen reaches its desired temperature indicating position, $T_0$, as determined by test 302 where the number of pulses N are compared to $N_p$, the motor is braked at 304. This can be done in different ways such as by disconnecting electrical power to the motor or shorting the motor leads together to use the back emf of the motor for braking.

After electrical power is removed, the motor tends to continue to rotate in a coasting mode to place the pen at a temperature indicating position of $T_1$. Hence, at 306, the pulses generated on line 104 during coasting are counted and the sum stored as $N_c$. Since such coasting tends to be of limited duration, the counting of coasting pulses is limited to a maximum interval. The coasting count $N_c$ represents a correction signal indicative of the amount that a pen has traveled past a desired parameter indicating position.

The stored position of the pen 38 is then adjusted to include the coasting motion of the motor after its connected pen had reached the desired position. The stored pen position, in the number of pulses, is then as determined at 308; note that this corresponds to a temperature indicating position of $T_1$ instead of $T_0$. No attempt is made to reverse the motor to correct for the coasting error.

However, when as indicated by test 311, a new temperature, $T_2$, measurement is to be made at 313 and its equivalent pulse count $N_{T2}$ is stored, further pen motions are made relative to the actual pen position, $N_{T1}$, and not the initial desired temperature position, $N_{T0}$.

This is implemented by first determining at tests 314 and 316 whether the new desired pen position $N_{T2}$ exceeds the old position $N_{T1}$ by a minimum count or number of pulses $N_{MIN}$ and the expected amount of coasting pulses $N_c$. If not, then no pen motion is implemented and a return is made at 318 to the main program along line 320. In the event the new temperature position exceeds the current pen position by more than $N_{MIN}+N_c$ pulses, the pen is moved after comparison at 322 which produces a signal representative of a desired pen travel that is equal to the difference less the amount of expected coasting pulses. A return is made to test 302 after a flag is set at 324 to force the subsequent coast count to be positive.

In the event the new temperature position, $N_{T2}$, requires a reversal of pen motion, as suggested in the diagram of 326, then the pen is moved at 328 by an amount equal to the difference less the amount of expected coast pulses. A return is then made to test 302 after a flag is set at 330 to force the subsequent coasting count to be negative when the pen's actual new position is determined at 308.

Note that with this technique an automatic learning is achieved in the amount of coasting pulses that are involved with the motors and related pen moving elements.

As shown in FIGS. 5, 7 and 8, chart drive motor 140 is mounted below a chart support surface 240 and has its drive shaft 242 connected to the drive spindle 62 with a bolt 244. Spindle 62 extends above surface 240 for engagement by chart holder 30. Spindle 62 has an annular bottom flange 246 that has its upper surface 247 aligned level with surface 240 so that chart 26 can seat level on both surfaces.

Spindle 62 extends above surface 240 with a circular shaft 248 that terminates at a head 250 having a through bore 252 and a counter bore 254 sized to receive the head of bolt 244.

Shaft 248 has a turned down segment 256 that terminates with an annular fulcrum surface 258 and at a rim 260 just above flange 246. Rim 260 serves to facilitate centering of a chart 26 onto spindle 62 as shown in FIG. 7.

Chart holder 30 serves as shown in FIGS. 7 and 8 to provide a rotational coupling of the spindle 62 with a chart 26 in a manner that permits easy placement and removal of a chart while providing good chart engagement to reduce chart tearing during rotation. This is achieved by forming chart holder 30 so that it can be pressed against a chart 26 without requiring rotation while providing an enlarged frictional surface contact.

Chart holder 30 is formed of a clamping segment made of a pair of sections 270, 272 which are mounted in juxtaposed spaced-apart positions with each other by a pair of stand-off pins or screws 274. The bottom surfaces 276 are flat and provide good frictional contact with a re-enforcing ring 278 on chart 26. Sections 270, 272 each have a partial cylindrical cut-out 280 so that when pins 274 hold the segments together, the head 250 of spindle 62 extends into them, preferably with a close tolerance fit.

Pins 274 are sized to space sections 270, 272 apart to form a slot 282 to receive a manual actuator 284. This has a deformable bias arm 286 which normally tends to be straight as shown in FIG. 8. Arm 286 terminates at oppositely-located pivot portions 288, 288' each of which has a bore 290 sized to freely receive a pin 274. The parts of the arms 288, 288' below the pins are sized and shaped to form edges 292 for seating as shown in FIG. 7 below and against annular fulcrum edge 258 of spindle 62 while surfaces 294 align parallel to the recessed segment 256 of spindle 62.

The distance between pins 274 is set so that arm 286 must be deformed as shown in FIG. 7 to align bores 290 with the pins. This produces a shape restoring moment in the direction of arrows 296. This tends to pivot arms 288, 288' and thus causes edges 292 to push against fulcrum edge 258 and clamp the entire chart holder 30 against chart 26.

A compressible spring 300 may be used to increase the chart clamping force. Spring 300 may be seated in a recess 302 in a platform 304 extending from segment 270 into slot 282 so as to fit below arm 286 as shown in FIG. 7.

With a chart holder 30 as illustrated in FIGS. 7 and 8, the removal and replacement of a chart 26 is made very convenient. Removal requires manual squeezing of the arm 286 against its natural bias thus pivoting edges 292 of arms 288, 288' away and allowing the holder 30 to be pulled away at the same time. The chart 26 can then be pulled away from spindle 62. When the arm 286 is squeezed during installation of a chart, it can then be rotated and time aligned by one hand.

FIG. 6 illustrates a pen 38 or 40 for use with recorder 20. The pens are preferably aligned so that the writing tips 310 project forwardly from ink containing chamber 312. This enables close placement of the pens to minimize time off-sets between them.

Figure 13:
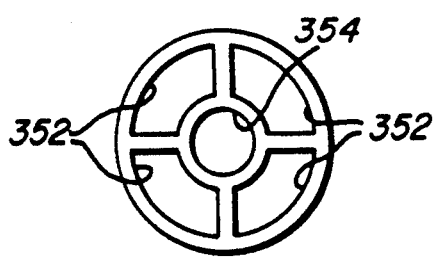
FIG. 13 is a back view of the chart holder in accordance with FIG. 12.
Figure 12:
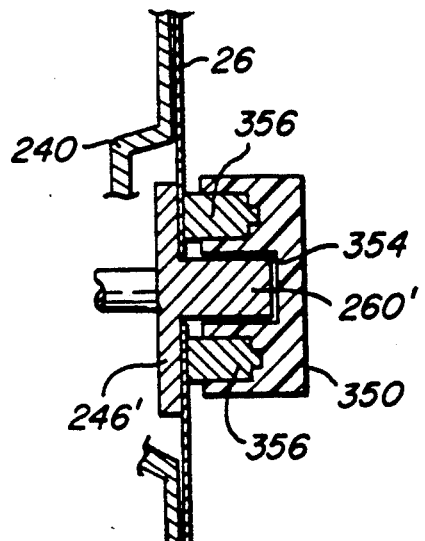
FIG. 12 is a section view of a magnetic chart holder in accordance with the invention.

FIGS. 12 and 13 illustrate another chart holder 350 which adheres magnetically to a flange 246' connected to chart motor 140. Flange 246' is formed of iron and has a spindle 260' shaped to fit through a hole 60 in a chart 26. Chart holder 350 is formed of a cylindrical plastic element having four recesses 352 arranged in an annular fashion around a central bore 354. Bore 354 is sized to freely but snugly receive spindle 260'.

Strong magnetic elements 356 are mounted in recesses 352 and project therefrom sufficiently to form an annular magnet by which chart 26 can be firmly held to flange 246'. Elements 356 can be ceramic type magnets that are selected to provide a firm clamping force to a chart 26 placed on the flange 246'. Elements 356 are sized to force fit in recesses 352.

By way of such magnetic chart holder, it is easy and convenient to replace or mount a chart 26.

Having thus described a chart recorder and chart in accordance with the invention, its advantages can be appreciated. Variations can be implemented without departing from the scope of the invention. For example, the motion of the leading pen can be delayed by storing its associated parameter values for a time that is equivalent to the actual spacing between pens.

What is claimed is:

1. A rotary planar chart recorder on which values of a parameter are recorded on a rotating chart with a pen that is moved in recording directions over the chart while the chart rotates at a desired rate, comprising:

a rotatable chart-supporting element having a chart-supporting surface surrounding a substantially central axis of rotation;

a pen actuator for carrying a pen along a travel path relative to said chart-supporting surface;

a windowed door movably supported opposite said chart-supporting surface to permit viewing of a chart supported on said chart-supporting surface;

said pen actuator being coupled to said door such that the pen carried by said pen actuator is moved away from the chart-supporting surface when the door is opened;

said pen actuator including a rotatable lead-screw aligned parallel to the travel path and coupled to the pen such that rotation of the lead screw causes movement of the pen along the travel path parallel to the lead screw;

means for measuring the rotation of the lead screw;

means responsive to parameter signals representative of values of a parameter for rotating the lead screw until a measured rotation reaches a desired amount corresponding to a desired parameter value-indicating position;

means for measuring the amount of rotation of the lead screw past the desired amount and for producing a coasting signal indicative thereof; and means responsive to the coasting signal to compensate for coasting movements of the pen carried by said actuator.

2. The rotary planar chart recorder as claimed in claim 1 wherein said door is shaped to form a recess, with said pen actuator being mounted in the recess.

3. The rotary planar chart recorder as claimed in claim 1 and further including:
means for producing a reference signal when the pen is at a reference position.

4. The rotary planar chart recorder as claimed in claim 3 and further including:
reset means for causing said pen to move to the reference position.

5. The rotary planar chart recorder as claimed in claim 1 and further including:
means for storing a peak value of the parameter signal; and
means for displaying said peak value.

6. The rotary planar chart recorder as claimed in claim 5 and further including:
means for storing maximum and minimum values of the parameter signal; and
means for selecting a stored value of the parameter signal for display thereof.

7. The rotary planar chart recorder as claimed in claim 1 and further including:
a chart holder formed of a chart clamping segment and a clamping actuator having a portion that is pivotally mounted to the clamping segment, said clamping actuator portion, when it is in one pivot position engaging the rotatable element and providing a spring bias forcing the clamping segment towards the chart support surface, while disengaging from the rotatable element when in another pivot position.

8. The rotary planar chart recorder as claimed in claim 7 wherein the clamping actuator has a pair of said portions and a deformable, normally straight arm that interconnects the portions, said deformable arm providing said spring bias when the clamping actuator portions engage the rotatable element.

9. The rotary planar chart recorder as claimed in claim 8 wherein the clamping segment is formed of a pair of spaced-apart sections separated by a slot, a pair of pins extending across the slot, said clamping actuator portions being pivotally connected to said pins inside the slot, said slot being shaped to receive said rotatable element.

10. The rotary planar chart recorder as claimed in claim 1 and further including:
a flange connected to the rotatable element, said flange having a magnetically receptive surface and a spindle sized to operatively engage a hole in the chart;
a chart holder having magnet means on a side thereof and further having a spindle bore sized to freely receive the spindle on the flange so as to enable the magnet means to clamp the chart to the flange when the chart holder is brought into operative engagement with the spindle.

11. The rotary planar chart recorder as claimed in claim 10 and further including:
means for storing a peak value of the parameter signal; and
means for displaying said peak value.

12. The rotary planar chart recorder as claimed in claim 11 and further including:
means for storing maximum and minimum values of the parameter signal; and
means for selecting a stored value of the parameter signal for display thereof.

13. The rotary planar chart recorder as claimed in claim 12 wherein the magnet means is annular in shape and located around the spindle bore.

14. The rotary planar chart recorder as claimed in claim 13 wherein the magnet means comprises a plurality of magnetic elements.

15. The rotary planar chart recorder as claimed in claim 1 wherein said means responsive to a signal representative of values of a parameter includes:
means for periodically sampling the parameter signal to produce a drive signal to operate the pen actuator, the drive signal being produced at a rate that is sufficiently high to record variations of the parameter as a function of time while being sufficiently low so as to limit electrical power consumption to a level where said chart recorder may operate over a desired time interval on a practical amount of battery power.

16. The rotary planar chart recorder as claimed in claim 15 wherein said drive signal is produced at a rate in the range from about once every one tenth to about once every half a degree of rotation.

17. A rotary planar chart recorder on which values of a parameter are recorded on a removable rotatable chart with a pen that is moved in recording directions over the chart while the chart is rotated about an axis of a rotating element driven into rotation at a desired rate, comprising:
a chart support surface surrounding the axis;
a pen actuator to move the pen along a travel path;
the pen recording a trace on the chart when the chart is mounted to the surface said pen is adapted to be mounted to the pen actuator;
a windowed door movably supported opposite said chart-supporting surface to permit viewing of a chart supported on said chart-supporting surface;
means for determining a current position of the pen along said travel path and producing a current position signal and means for generating a new position signal representative of a difference between the current position of the pen and a new position therefor less an amount that corresponds to a coasting of the pen past a previous desired parameter value indicating position.

18. The rotary planar chart recorder as claimed in claim 17 and further including:
means for generating a correction signal representative of the amount of pen motion past said desired parameter value indicating position;
means for generating a minimum difference signal to enable pen movement when the new pen position signal differs from the current pen position signal by at least a sum of the difference signal and the correction signal.

19. The rotary planar chart recorder as set forth in claim 17, wherein the pen actuator includes a DC motor;
means for generating a braking signal to stop the DC motor when the pen has been moved to said desired parameter value indicating position;
means for generating a correction signal representative of the amount of movement of the pen after initiation of the braking signal; and
means responsive to the correction signal for storing a signal representative of an actual pen position.

20. The rotary planar chart recorder as set forth in claim 19 and further including:
means for comparing the stored pen position signal with a new desired pen position signal; and
means responsive to the comparing means for moving the pen when the new pen position signal differs from the stored pen position signed by a predetermined minimum amount.

21. The rotary planar chart recorder as claimed in claim 20 and further including:
a flange connected to the rotating element, said flange having a magnetically receiptive surface and a spindle sized to operatively engage a hole is the chart;
a chart holder having magnet means on a side thereof and further having a spindle bore sized to freely receive the spindle on the flange so as to enable the magnet means to clamp the chart to the flange when the chart holder is brought into operative engagement with the spindle.

22. A chart holder for a planar chart recorder in which a chart is rotated by a rotating element that extends through the center of the chart and has a magnetically receptive flange, comprising:
a chart holder having magnet means on a side thereof and further having a spindle bore sized to freely receive the spindle on the flange so as to enable the magnet means to clamp the chart to the flange when the chart holder is brought into operative proximity with the flange.

23. A chart holder as claimed in claim 22 wherein the magnet means is annular in shape and located around the spindle bore.

24. A chart holder as claimed in claim 22 wherein the magnet means comprises a plurality of magnetic elements.

* * * * *